United States Patent Office 3,215,114
Patented Nov. 2, 1965

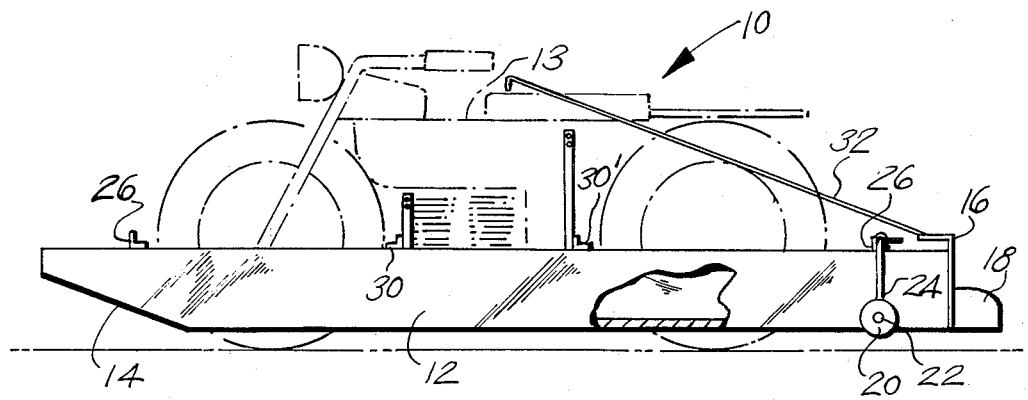
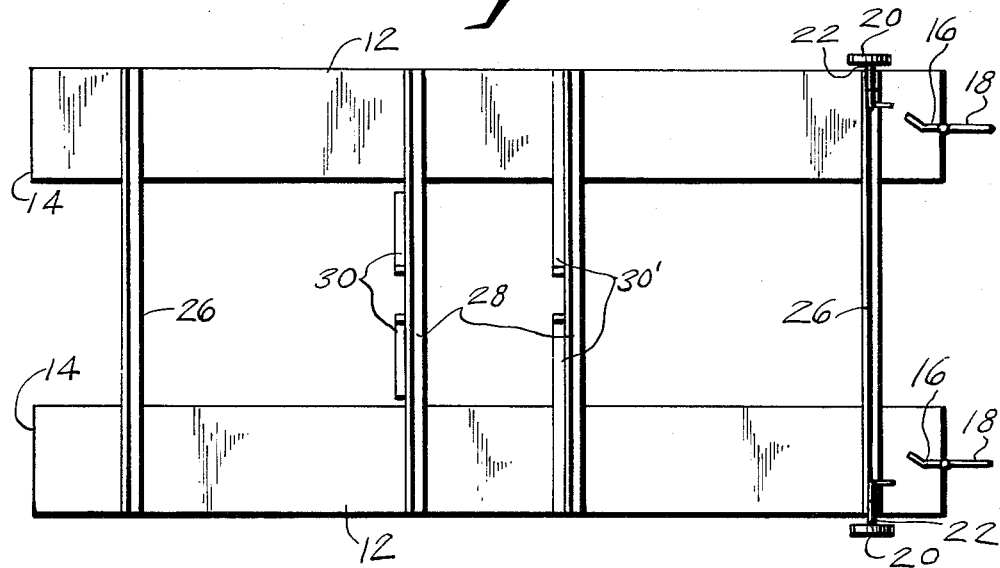

3,215,114
MOTORCYCLE PONTOONS
Walter F. Jenkins, Box 17, Fulton, Mich.
Filed Sept. 29, 1964, Ser. No. 400,022
2 Claims. (Cl. 115—1)

This invention relates to attachment devices for motorcycles and more particularly to a pontoon attachment for motorcycles.

It is an object of the present invention to provide pontoon attachment for motorcycles which will enable the fishman to fish in places where it would ordinarily be too deep to fish by wading.

Another object of the present invention is to provide an attachment for motorcycles which will allow the operator of the machine to float along the river, and the attachment will have rudder means to steer it when necessary.

A further object of the present invention is to provide pontoon attachment for motorcycles which will be easily attached or detached from the machine and will allow the rider to take the vehicle into territory which would be very difficult or impossible to reach by automobile, while at the same time serving as a road vehicle and a water vehicle.

A still further object of the present invention is to provide an attachment for motorcycles which will float the machine and the machine may have an attachment to propel the combination in the water.

Other objects of the invention are to provide pontoon attachments for motorcycles bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side view of the present invention showing the motorcycle in phantom lines; and FIGURE 2 is a top plan view of the invention with the motorcycle shown removed therefrom.

Referring now more in detail to the drawing, a pontoon attachment for motorcycles 10 made in accordance with the present invention is shown to include a pair of hollow, elongated floats 12 providing floation means for motorcycle 13. Floats 12 are tapered upward at their forward ends 14 providing for easy forward travel in the water, and a vertical and pivotable rod 16 is secured at the end of each float 12 and is provided with a rudder 18 which allows for steering motorcycle 13 while in the water. A pair of rotatable wheels 20 are rotatably secured to axles 22 and prevent floats 12 from scraping the ground when motorcycle 13 is driven on land. A spring-loaded arm 24 on each of the floats 12 provides a means of raising wheels 20 when the device is in the water. A lever arm 24' is fixedly secured to arms 24 and provides a means of rotating arms 24 in order to raise or lower wheels 20 of the device. A pair of parallel, L-shaped rails 26 are fixedly secured to the forward and aft ends of the upper surface of floats 12 and secure floats 12 parallel to each other. Rails 26 are secured to floats 12 by any suitable fastening means, and a pair of center L-shaped configurated rails 28 are parallel and spaced apart and thus provide a means for attaching pontoon attachment 10 to the motorcycle 13. A pair of angular support braces 30 and 30' are secured by suitable fastening means to center rails 28 and the upper extremities of rails 30 and 31' are secured to the frame of motorcycle 13 by quick detachable bolts or other fasteners. A rudder control rod 32 is secured to rod 16 and this provides a means for controlling the direction of motorcycle 13 in the water.

In use, the operator of motorcycle 13 attaches the support braces 30 and 30' to the frame of motorcycle 13 by suitable fasteners and after lowering wheels 20 drives motorcycle 13 to the spot at which he wishes to fish. If the operator desires, he may ride motorcycle 13 into the water after retracting wheels 20 and thus motorcycle 13 will float while the rider fishes. Steering is accomplished in the well known manner by manipulating rod 16 and the attached rudders 18.

It shall be noted that various forms of propulsion may be secured to motorcycle 13 to thus provide a means for propelling the heretofore described combination through the water.

It shall further be noted that wheels 20 may be retracted upwardly within slots 24 by any of the well known means practiced in the art.

While various changes may be made in the detail construction, it shall be understood that such changes shall be within the spirit and scope of the present invention as defined by the appended claims.

What I claim as new and desire to protect by Letters Patent of the United States is:

1. A pontoon attachment for motorcycles comprising in combination a pair of parallel, spaced apart and elongated hollow floats, a pair of retractable wheels carried by said floats providing stability upon land for motorcycle to which said floats are secured, rudder means carried by said floats and control rod means carried by said floats providing means for steering said motorcycle and its associated pontoons on water, a pair of parallel and spaced apart L-shaped rails carried by said floats forward and aft to provide means for securing and stabilizing said floats, a pair of center L-shaped rails carried by said floats providing a means of securing said floats to the frame of said motorcycle and a plurality of support braces, the forward end of said floats being angled upwardly at the bottom to enable smooth breaking of water ahead of said motorcycle secured to said floats, said rods providing a steering means for said floats and being pivotably secured to the rear of said floats, said rudder extending rearwardly of said rods to provide water resistance to enable steering of said motorcycle and said associated pontoon floats, control rod means of elongated configuration being secured to said rods containing said rudders and providing a means for pivoting said rods containing said rudders and providing a means for pivoting said rods containing said rudders to steer said motorcycle when said machine is in the water, securement means for said floats to each other comprising said forward L-shaped rail and said rearward L-shaped rail and said forward rail and said rearward rail being secured to the upper surfaces of said floats of said device by suitable fastening means, said motorcycle being received between said forward rail and said aft rail of said device and stabilizing said motorcycle in an upright position between said floats, a pair of parallel, spaced apart center rails of L-shaped configuration being secured to the center area of the top surface of said floats and providing a means for securing said pontoon attachment to said motorcycle received between said floats by angular support brace means.

2. The combination according to claim 1 wherein said angular support braces are secured on either side of the frame of said motorcycle by suitable fastener means at the upper extremity of said support braces and thus said pontoon attachment is easily attached to the frame of said motorcycle and easily detached from said frame of said motorcycle.

References Cited by the Examiner

UNITED STATES PATENTS

| | | | |
|---|---|---|---|
| 577,269 | 2/97 | Powley | 115—26 |
| 615,871 | 12/98 | Moller | 115—2 |
| 691,805 | 1/02 | Perry | 115—26 |
| 2,369,973 | 2/45 | Montalbano | 115—26 |

MILTON BUCHLER, *Primary Examiner.*

ANDREW H. FARRELL, *Examiner.*